UNITED STATES PATENT OFFICE 2,394,442

DIELECTRIC FLUIDS

Paul M. Gross, Marcus Hobbs, and Charles K. Bradsher, Durham, N. C.

No Drawing. Application June 29, 1943, Serial No. 492,777

1 Claim. (Cl. 252—66)

This invention relates to a new class of dielectric fluids or oils.

The materials commonly used as liquid insulating or dielectric media in transformers, condensers and other electrical devices are hydrocarbons and various halogenated hydrocarbons (i. e. halocarbons). For many of these applications it is necessary that the liquid be not only resistant to electrical breakdown, but that it additionally be fluid over wide ranges of temperature (particularly low temperature) and also non-inflammable. The hydrocarbons alone provide excellent ranges of fluidity and high dielectric strength, but they are also highly inflammable. The halocarbons which have been developed heretofore for insulating purposes are non-inflammable, but they have relatively short temperature ranges in the liquid state. That is, some are high boiling compounds which also have high melting points, and others which are liquid at low temperatures are extremely volatile. In addition, these halocarbons have not shown nearly the stability to decomposition that is characteristic of the pure hydrocarbons, and both the hydrocarbons and the halocarbons currently in use are subject to gum formation and oxidation over long periods of time.

This invention provides certain new liquid dielectric compositions which are characterized by their non-inflammability, stability in the presence of moisture, relative freedom from attack on metals, extreme temperature ranges of the liquid state and very low freezing points. They also have high dielectric strength and dielectric constants suitable for the various uses of dielectric fluids.

They are therefore particularly suitable for use under conditions of extremely low temperature, such as are encountered in high altitude flying, and also the high temperature conditions often occurring in large power plants and sub-stations.

The dielectric fluids of this invention contain as an essential ingredient one or more compounds selected from a certain group of ring halogenated 1,3-bis-trifluoromethyl benzenes (also called ring halogenated hexafluoro - meta - xylenes). The compounds of this group may be designated by the following structural formula

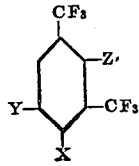

wherein the radicals X and Y are selected from the group consisting of fluorine, chlorine, bromine and hydrogen, and the radical Z is selected from the group consisting of fluorine, bromine and hydrogen, and wherein at least one of said radicals is one of said halogens. This group may also be described as ring mono-, di- and trihalogenated 1,3 - bis - trifluoromethyl benzenes wherein the 2 position may contain fluorine or bromine, the 4 and 5 positions may contain fluorine, chlorine or bromine and the 6 position remains unsubstituted.

It will be noted that iodine derivatives are expressly omitted, and this is because the iodine derivatives do not have the necessary physical properties to render them superior to conventional dielectric oils.

Certain members of this group are outstanding for their extreme stability, low freezing points and the like, and three of these compounds are preferred in preparing the dielectric oils of this invention. The are (1) 4-chloro-1,3-bis-trifluoromethyl benzene

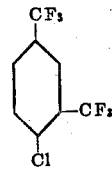

M. P. (about) −50° C., B. P. (about) 148° C.

(2) 5-chloro-1,3-bis-trifluoromethyl benzene

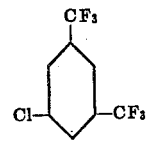

M. P. (about) −25° C., B. P. (about) 138° C.

(3) 4,5-dichloro-1,3-bis-trifluoromethyl benzene

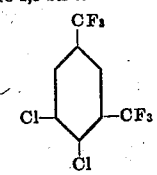

M. P. (about) −35° C., B. P. (about) 173° C.

Of these three compounds the two monochloro derivatives are of special interest in that they not only have a long temperature range in the liquid state, extending down to low temperatures, but they also form a eutectic mixture having the extremely low freezing point of about minus 60° C. (minus 76° F.). The proportions of the two compounds which form the low-freezing mixture (i. e. 4-chloro-1,3-bis-trifluoromethyl benzene and 5-chloro-1,3-bis-trifluoromethyl benzene) are between about 40% and about 60% by volume of one compound in the other.

The compounds are prepared by first halogenating the meta-xylene in the ring and methyl groups with a halogen other than fluorine, according to standard practice, and then replacing the halogen in the methyl groups with fluorine by treatment with anhydrous hydrogen fluoride, preferably in the presence of a solvent which is inert to hydrogen fluoride. A detailed example of the preparation of the monochloro derivatives described above is as follows:

EXAMPLE 1.—(4 - CHLORO - 1,3 - BIS - TRIFLUOROMETHYL BENZENE AND 5-CHLORO 1,3-BIS-TRIFLUOROMETHYL BENZENE)

One hundred twenty (120) parts by weight of meta-xylene were placed in a glass vessel, heated to between 120° and 130° C. and exposed to ultraviolet light. Then chlorine was passed into the meta-xylene at a slow rate for the first three hours, after which the rate of chlorine feed was increased. The time for which the chlorine was passed through the meta-xylene varied from 7 to 22 hours. The product from the chlorination was purified by fractional distillation under reduced pressure. The yield of hexachloro-xylene ranged from about 50% to about 95% for different runs. A simple way to remove the hexachloro-meta-xylene directly from the reaction mixture is to cool the latter and filter off the crystalline product, as the hexachloro-meta-xylene melts at 35° C. On distillation of the mother liquor fractions are obtained which yield additional hexachloro meta-xylene on cooling.

The hexachloro-meta-xylene was ring chlorinated at a temperature of about 120° to 140° C. by passing chlorine through the compound, using iron filings as a catalyst. About 4 to 5 hours were required to get a weight increase which corresponded to 110 to 120% of the theoretical increase for one chlorine atom substitution. The ring chlorinated products were separated by distillation. The distillation of the product yielded a fraction which was essentially a mixture of the 4-chloro- and the 5-chloro-derivatives. From this mixture 5-chloro - 1,3 - bis - trichloromethyl benzene melting at 78° C. was separated by crystallization. The mother liquor from this crystallization contained substantial quantities of 4-chloro-1,3-bis-trichloromethyl benzene boiling at 180–185° C. at 7.5 mm. pressure.

These two compounds were reacted with anhydrous hydrogen fluoride under a pressure of 250–300 lbs. and at a temperature from 80° to 120° C. to yield compounds with completely fluorinated methyl groups, namely 4-chloro-1,3-bis-trifluoromethyl benzene and 5-chloro-1,3-bis-trifluoromethyl benzene. In some instances it is desirable to conduct the reaction with hydrogen fluoride in the presence of a solvent which is inert to hydrogen fluoride to reduce possible side reactions, and 1,3-bis-trifluoromethyl benzene is suitable as such a solvent.

EXAMPLE 2.—(4,5-DICHLORO-1,3-BIS-TRIFLUOROMETHYL BENZENE)

Further ring chlorination of the hexachloro-meta-xylene described in Example 1 resulted in the introduction of two chlorine atoms in the ring. The 1,3-bis-trichloromethyl benzene was reacted with chlorine in the presence of iron filings at 120–150° C. until a weight increase corresponding to slightly more than the theoretical for the introduction of two chlorine atoms into the ring resulted. On distillation and separation of this product 4,5-dichloro-1,3-bis-trichloromethyl benzene melting from 55 to 60° C. was obtained in good yield and a lesser amount of 2,5-dichloro - 1,3 - bis - trichloromethyl benzene melting at 191–192° C. The 4,5-dichloro compound was fluorinated as described in Example 1 with respect to the monochloro derivatives, yielding 4,5-dichloro-1,3-bis-trifluoromethyl benzene, melting at about minus 35° C. and boiling at about 172° C.

Other ring halogenated 1,3-bis-trifluoromethyl benzenes may also be made by the same general procedures as described above, the actual ring halogenation procedures which are performed before complete fluorination of the methyl groups being according to general practice. These procedures may include the generally known reactions for introduction of a halogen into the aromatic ring such as direct reaction with a halogen with or without a catalyst present; the replacement of an amino group by a halogen through a diazotization procedure as in the Sandmeyer or Schieman reactions or other procedures. These procedures for introducing halogen into the ring may in some cases be carried out before the chlorination of the methyl groups and the subsequent replacement of this chlorine in the methyl groups with fluorine by reaction with anhydrous hydrogen fluoride.

Thus it is convenient in preparing 4-chloro-1,3-bis-trifluoromethyl benzene to chlorinate meta-xylene in the ring in the usual manner using iron filings as a catalyst to produce 4-chloro-1,3-dimethyl benzene. This compound is then chlorinated in the presence of light to produce 4-chloro-1,3-bis-trichloromethyl benzene and the latter is subsequently reacted with hydrogen fluoride as described in the latter part of Example 1 above to produce 4-chloro-1,3-bis-trifluoromethyl benzene. On the other hand it is more convenient to prepare 5-chloro-1,3-bis-trifluoromethyl benzene by first preparing 1,3-bis-trichloromethyl benzene and then chlorinating this in the ring to produce 5-chloro-1,3-bis-trichloromethyl benzene and subsequently converting this to 5-chloro-1,3-bis-trifluoromethyl benzene carrying out all the steps as described in Example 1 above.

Corrosion tests of these compounds at 100° C. for four days and at 150° C. for seven days, in contact with steel, copper and an aluminum alloy (condition T) showed almost no attack on the metal over a period of seven days. In the presence of water and air, at these temperatures, the corrosion was not significantly above that obtained from water alone, except for polyhalogenated ring compounds (e. g. the 4,5-dichloro compound described above). However, the test at 150° C. in the presence of water and air is particularly severe, and such conditions would probably occur only very infrequently in practical use.

Thermal stability tests have shown that the fluids of this invention have about the same initial stability as the best hydrocarbon oils, but once decomposition sets in the conventional oils deteriorated rapidly at lower temperatures whereas the fluorocarbons described did not. It is believed that this phenomenon is due in part to the fact that the conventional oils deposited carbon on decomposition which may have exerted a catalytic effect, whereas the breakdown products of the fluorocarbons tested either remained in the gaseous state or deactivated the surface of any carbon formed.

For the varied applications in electrical devices it is desirable to have a range of electrical properties, the most appropriate values of which depend on the particular application involved. Thus it is desirable to have a liquid of high dielectric constant in applications involving condensers, as the capacity of a condenser of given dimensions increases with the dielectric constant of the medium used between its plates. On the other hand, a transformer oil should preferably have a dielectric constant approximating that of the solid insulators used in the transformer construction.

The 4-chloro-1,3-bis-trifluoromethyl benzene is especially suitable as a condenser oil because it has the high dielectric constant of 5.5 at 18° C., whereas the 5-chloro-1,3-bis-trifluoromethyl benzene has the low dielectric constant of about 3.0 at 20° C. The various mixtures of the two compounds possess dielectric constants between these values, at about 20° C., thus making it possible to select the most appropriate value of dielectric constant for a given application.

Further advantages of the compositions of this invention which make them well suited for use as dielectric fluids are their low viscosities and high mobilities as is shown for the above two compounds in the table. This, together with their rather high densities (about 1.5 gm./ml.), makes them good heat conductors, a property of importance in some electrical devices.

Table

|  | Viscosity in millipoises at— | | | | |
| --- | --- | --- | --- | --- | --- |
|  | 20° C. | 30° C. | 40° C. | 50° C. | 60° C. |
| 4-chloro-1,3-bis-trifluoromethyl benzene | 15.17 | 12.77 | 10.90 | 9.50 | 8.38 |
| 5-chloro-1,3-bis-trifluoromethyl benzene | 12.36 | 10.67 | 9.28 | 8.14 | 7.31 |

Although the compounds described by the general structural formula given above are preferably used in substantially pure form of in admixture with each other, as dielectric fluids, they may also be used to excellent advantage as components of other well known oils.

The bis-trifluoromethyl benzenes described in the example are described and claimed in copending application Serial No. 492,778; their intermediate 1,3-bis-trichloromethyl benzenes are described and claimed in copending application Serial No. 492,774; and hydraulic and lubricating oils containing the fluorinated compounds are described and claimed in copending application Serial No. 492,775, all filed of even date herewith.

Many variations will be apparent to those skilled in the art, and the invention should not be limited other than as defined by the appended claim.

We claim:

A dielectric fluid consisting of a mixture of about 40 per cent to about 60 per cent by volume of 4-chloro-1,3-bis-trifluoromethyl benzene, and the balance 5-chloro-1,3-bis-trifluoromethyl benzene.

PAUL M. GROSS.
MARCUS HOBBS.
CHARLES K. BRADSHER.